3,275,572
REFRACTORY COMPOSITION AND ELECTRICAL RESISTANCE MADE THEREFROM
Samuel Ruben, 53 Seacord Road, New Rochelle, N.Y.
No Drawing. Filed Oct. 11, 1961, Ser. No. 144,292
10 Claims. (Cl. 252—518)

This invention relates to a refractory material which, in its various compositions, is useful for fabrication into oxidation and temperature resistant structural parts, such as an electrical resistor and other applications.

A general object of the invention is to provide a material which is suitable for use in oxidizing atmospheres at high temperatures.

A further object is to provide an improved electrical resistor element.

Another object is the provision of a refractory electrically conductive material capable of operation and maintaining mechanical strength at high temperatures in an oxidizing atmosphere.

Another object is to provide a process for producing inert refractory compositions and electrical resistors capable of operating at high temperatures in oxidizing atmospheres.

Other objects will be apparent from the disclosure.

In the past there has been a general recognition that molybdenum disilicide is a useful base material in the production of compositions capable of operating at high temperatures in oxidizing atmospheres and electrical resistance elements. However, no completely practical and low-cost method has been devised for the successful commercial utilization of molybdenum disilicide for these applications, nor, as far as I am aware, has any composition been heretofore devised to provide the required characteristics.

I have found that molybdenum disilicide, when reacted with vanadium pentoxide, provides a new material which is useful as a refractory electrically conductive material capable of operation at high temperatures in an oxidizing atmosphere and of maintaining its structural strength under such conditions. The characteristics of the new composition are such that it provides a useful electrical resistance element.

In the process of producing the new material, molybdenum disilicide and vanadium pentoxide are ground to a fine powder and are then heated to the melting point (690° C.) of vanadium pentoxide which melts and flows through the mass. The mixture is then heated to a substantially higher temperature, such as from about 1000° C. up to about 1500° C. During the process the vanadium pentoxide reacts with the molybdenum disilicide, and an exothermic reaction is observed, for the mixture rises to a high temperature for a period of time until the reaction is complete. The final product is a hard, well-bonded mass in which the low temperature melting characteristics of the vanadium pentoxide are absent and which can be repeatedly heated to high temperatures without loss of its mechanical or structural properties or its electrical conductivity.

The proportion of vanadium pentoxide used in respect to the molybdenum disilicide is dependent upon the desired mechanical and electrical characteristics and may be in the range of 2% to 25% by weight of vanadium pentoxide. For most applications, a proportion of 10% by weight of vanadium pentoxide to the weight of the combined materials is adequate to provide a solid refractory bond.

In the production of rods formed from the molybdenum disilicide-vanadium pentoxide compositions, the materials may be compressed at a pressure of 10,000 lbs. per square inch into the desired shapes. If desired, various volatile binders common in the art of fabricating pressed powder articles may be employed to provide desired strength and shape, and other non-deleterious metals or compounds may be added in minor proportions.

The compositions may be used to provide parts for jet engines, missiles, high temperature corrosion resistant vessels, molds, crucibles, electrical resistors, etc.

The molybdenum disilicide-vanadium pentoxide compositions of the invention provide excellent results for structural and other non-electrical applications and can also provide electrical resistances of satisfactory characteristics. I have discovered, however, that the characteristics of electrical resistances made from the said compositions may be further considerably improved by adding stannous oxide (SnO) to the molybdenum disilicide-vanadium pentoxide during the process of manufacture. The addition of stannous oxide provides a number of important and unexpected advantages. It makes possible obtaining a wider range of resistance values in electrical resistors and substantially improves the reproducibility and uniformity of such values in quantity production. It improves the density and mechanical strength of the product even at elevated operating temperatures. Moreover, the addition of stannous stannic oxide in suitable proportion permits adjusting the temperature coefficient of resistance within a relatively wide range from a positive value through zero to a negative value.

The amount of stannous oxide added to the molybdenum disilicide-vanadium pentoxide composition may be varied within a rather wide range in accordance with the desired specific resistivity and temperature coefficient of resistance. Thus, good results are obtained by adding from about 1% to about 20% by weight stannous oxide to the composition. The preferred range is from about 5% to about 12% of stannous oxide figured for the weight of the entire composition. A specific value which was found to provide excellent results is about 10% by weight of stannous oxide.

In order that those skilled in the art may have a better understanding of the invention, the following illustrative example may be given from which the preferred process of making the molybdenum disilicide-vanadium pentoxide-stannous oxide compositions and resistances will likewise become apparent.

Eight parts by weight of molybdenum disilicide, one part by weight of vanadium pentoxide and one part by weight of stannous oxide in powder form are thoroughly ground and mixed, and are pressed into rod-shaped compacts at a pressure of 15,000 lbs. per square inch. The compacts are then heated to a temperature of about 1200° C. During this heating, the vanadium pentoxide melts at about 690° C. and upon increase of the temperature to about 1200° C., a reaction will occur between the molybdenum disilicide, vanadium pentoxide and stannous oxide. This reaction is exothermic, as indicated by a sudden increase in the temperature of the unit at one point during the heating temporarily raising the temperature of the unit considerably above the temperature produced by the heating means of the furnace. However, prolonged heating of the units to temperatures above 1200° C. is undesirable as it may cause loss of stannous oxide due to volatilization.

By variation of the stannous oxide content, and in some cases also of the vanadium pentoxide content, a wide range of resistance values can be obtained. The resistance was found to have excellent stability and reproducibility. The resistance in the form of a solid rod has no longer the properties of vanadium pentoxide but maintains its mechanical strength at elevated operating temperatures as high as 1000° C. Therefore, the resistances of the invention are well suited for radiant heaters and for similar high temperature applications.

In most cases, the rod-shaped resistances of the invention are provided with suitable terminals. When the desired operating temperature does not exceed 900° C., the terminal may be provided by applying a suitable silver compound or paint to the terminal regions of the rod and firing it in the usual manner. For higher operating temperatures, terminals made of a nickel-chromium-iron alloy sold under the name Nichrome were found to be quite suitable. Preferably, the terminals are in the form of rivets or similar structures which are molded in the ends of the powder mix during compacting and are permanently bonded to the mix during the sintering process and reaction. In this manner, the Nichrome terminal is protected from oxidation by the solid, dense mass produced after reaching the reaction temperature.

In general, resistances made from molybdenum disilicide and vanadium pentoxide, containing no stannous oxide, have a positive temperature coefficient of resistance, whereas resistances containing all three materials in suitable proportions have a negative temperature coefficient of resistance. By suitably adjusting the proportions of the constituents, any desired temperature coefficient of resistance, including zero, can be obtained within a certain range.

The following tables gives the resistance values in ohms at temperatures from 50° to 300° C. of two resistors of identical dimensions, one of which was composed of 90% $MoSi_2$ and 10% $V_2O_5$ and the other was composed of 80% $MoSi_2$, 10% $V_2O_5$ and 10% SnO.

| Temperature, ° C. | Resistance, Ohms | |
|---|---|---|
| | 90% $MoSi_2$, 10% $V_2O_5$ | 80% $MoSi_2$, 10% $V_2O_5$, 10% SnO |
| 50 | 2.62 | 2.60 |
| 100 | 2.70 | 2.38 |
| 150 | 2.75 | 2.25 |
| 200 | 2.88 | 2.13 |
| 250 | 3.00 | 2.05 |
| 300 | 3.13 | 1.97 |

Although the present invention has been disclosed in connection with a few preferred embodiments thereof, variations and modifications may be resorted to by those skilled in the art without departing from the principles of the invention. All of these variations and modifications are considered to be within the true spirit and scope of the present invention, as disclosed in the foregoing description and defined by the appended claims.

What is claimed is:

1. A composition of matter composed essentially of 2% to 25% by weight of vanadium pentoxide, 1% to 20% by weight of stannous oxide, and the balance molybdenum disilicide, said composition being characterized by a stable electrical resistance and by a temperature coefficient of resistance which is adjustable between positive and negative values by adjusting the proportion of its constituents.

2. A pressed and sintered powder composition composed essentially of 2% to 25% by weight of vanadium pentoxide, 5% to 12% by weight of stannous oxide, and the balance molybdenum disilicide, said composition being characterized by a stable electrical resistance and by a temperature coefficient of resistance which is adjustable between positive and negative values by adjusting the proportion of its constituents.

3. A pressed and sintered powder composition characterized by a stable electrical resistance and by a temperature coefficient of resistance which is adjustable between positive and negative values by adjusting the proportion of its constituents, said composition consisting essentially of 2% to 25% by weight of vanadium pentoxide, 1% to 20% by weight of stannous oxide, and the balance molybdenum disilicide, said composition being the reaction product of heating the constituents to a temperature in excess of 1000° C. for a period sufficient to cause exothermic reaction of the constituents but insufficient to cause loss of stannous oxide, due to volatilization.

4. An electrically conducting oxidation-resistant pressed and sintered refractory composition resistant to oxidation at high temperatures characterized by a stable electrical resistance and by a temperature coefficient of resistance which is adjustable between positive and negative values by adjusting the proportion of its constituents, said composition consisting essentially of 2% to 25% by weight of vanadium pentoxide, 1% to 20% by weight of stannous oxide, and the balance molybdenum disilicide, and said composition being the reaction product of heating the mixture of the compacted constituent powders to a temperature between about 1000° C. and about 1200° C. for a period sufficient to cause exothermic reaction of the said constituent powders but insufficient to cause loss of stannous oxide due to volatilization.

5. An electrical resistor suitable for high temperature operation constituted by a pressed and sintered powder compact characterized by a stable electrical resistance and by a temperature coefficient of resistance which is adjustable between positive and negative values by adjusting the proportion of its constituents, said compact consisting essentially of about 2% to about 25% by weight of vanadium pentoxide, about 5% to about 12% by weight of stannous oxide, and the balance molybdenum disilicide, and said compact being the reaction product of heating the mixture of the constituent powders to a temperature between about 1000° C. and about 1200° C. for a period sufficient to cause exothermic reaction of said constituent powders but insufficient to cause loss of stannous oxide due to volatilization.

6. The electrical resistor claimed in claim 5, wherein an electrical terminal is provided at each end of the sintered compact.

7. The electrical resistor claimed in claim 5, wherein a terminal of an oxidation-resistant nickel-chromium-iron alloy is embedded in each end of the sintered compact.

8. The method of making a composition suitable for use as a high temperature oxidation-resistant element characterized by a stable electrical resistance and by a temperature coefficient of resistance which is adjustable between positive and negative values by adjusting the proportion of its ingredients, which method comprises providing a powder mixture essentially composed of 2% to 25% by weight of vanadium pentoxide, 1% to 20% by weight of stannous oxide, and the balance molybdenum disilicide, and heating the mixture to a temperature which is sufficiently high to initiate and for a period sufficiently long to complete exothermic reaction of the constituents, said period being insufficient to cause loss of stannous oxide due to volatilization.

9. The method of making electrical resistors suitable for operation at elevated temperatures characterized by stable electrical resistance and by a temperature coefficient of resistance which is adjustable between positive and negative values by adjusting the proportion of their constituents, which method comprises mixing together 2% to 25% by weight of vanadium pentoxide particles, 1% to 20% by weight of stannous oxide particles, molybdenum disilicide particles constituting the balance, pressing compacts from said mixture, and sintering said compacts at a temperature between 1000° C. and 1200° C. for a period sufficient to cause exothermic reaction of the constituents while being insufficient to cause loss of stannous oxide due to volatilization.

10. The method of making electrical resistors characterized by stable electrical resistance and by a temperature coefficient of resistance which is adjustable between positive and negative values by adjusting the proportion of their constituents, which method comprises mixing together 2% to 25% by weight of vanadium pentoxide particles, 5% to 12% by weight of stannous oxide particles, and molybdenum disilicide particles to constitute the balance, pressing compacts from the mixture, heating the compacts to a temperature greatly exceeding the melting point of vanadium pentoxide and sufficiently high to initiate exothermic reaction of the constituents, and continuing said heating for a period which is sufficient to complete said exothermic reaction while being insufficient to cause loss of stannous oxide due to volatilization.

References Cited by the Examiner

UNITED STATES PATENTS

| | | | |
|---|---|---|---|
| 2,419,537 | 4/1947 | Christensen | 338—309 |
| 2,717,946 | 9/1955 | Peck | 252—518 XR |
| 2,955,145 | 10/1960 | Schrewelius | 252—518 XR |
| 2,998,394 | 8/1961 | Charvat | 252—518 |
| 3,006,865 | 10/1961 | Ruben | 252—518 |
| 3,023,390 | 2/1962 | Moratis et al. | 338—309 |
| 3,027,331 | 3/1962 | Schrewelius | 252—518 |

FOREIGN PATENTS

| | | |
|---|---|---|
| 1,035,739 | 8/1958 | Germany. |
| 1,082,333 | 5/1960 | Germany. |

OTHER REFERENCES

Drummer, Fixed Resistors. Pitman and Sons (1956), p. 72.

LEON D. ROSDOL, *Primary Examiner.*

RICHARD M. WOOD, JULIUS GREENWALD, ALBERT T. MEYERS, *Examiners.*

H. T. POWELL, J. D. WELSH, *Assistant Examiners.*